United States Patent [19]
Harden

[11] 3,735,303
[45] May 22, 1973

[54] ROTARY MAGNETIC POSITION INDICATOR HAVING ODD NUMBER OF POSITIONS

[75] Inventor: Phillip L. Harden, Fort Wayne, Ind.

[73] Assignee: Bowmar Instrument Corporation, Fort Wayne, Ind.

[22] Filed: Oct. 18, 1971

[21] Appl. No.: 190,150

[52] U.S. Cl............................335/272, 340/378 MW
[51] Int. Cl..................................................H01f 7/14
[58] Field of Search.....................335/229, 230, 279, 335/281, 272; 340/378 R, 378 A, 378 MW

[56] References Cited
UNITED STATES PATENTS

| | | | |
|---|---|---|---|
| 3,166,744 | 1/1965 | Leonchick | 340/378 MW |
| 3,530,461 | 9/1970 | Steinberg | 340/378 MW |
| 3,260,871 | 7/1966 | Lang | 340/378 X |
| 3,470,509 | 9/1969 | Silverman et al. | 335/229 |
| 3,508,256 | 4/1970 | Dudley et al. | 340/378 |

*Primary Examiner*—George Harris
*Attorney*—Hood, Gusti, Irish, Lundy & Coffey

[57] ABSTRACT

A rotary magnetic position indicator which provides an odd number, such as eleven, positions. A magnetic stator structure is provided including an odd number of radially inwardly extending, equally angularly spaced polar projections respectively having inner ends which define a bore, and an equal number of coils is positioned on the stator structure. A permanent magnet rotor member is rotatably mounted in the bore and has one polar projection of one polarity, and two polar projections of the opposite polarity equally spaced on opposite sides of a diameter of the rotor member which extends through the one polar projection. The two rotor member polar projections are respectively aligned with two adjacent stator polar projections when the one rotor member polar projection is aligned with another stator polar projection. Means are provided for selectively energizing the coils, one at a time, thereby to polarize the respective stator polar projection oppositely from the polarization of the one rotor member polar projection thus causing the one rotor member polar projection to align itself with the energized stator polar projection.

6 Claims, 4 Drawing Figures

Patented May 22, 1973 3,735,303
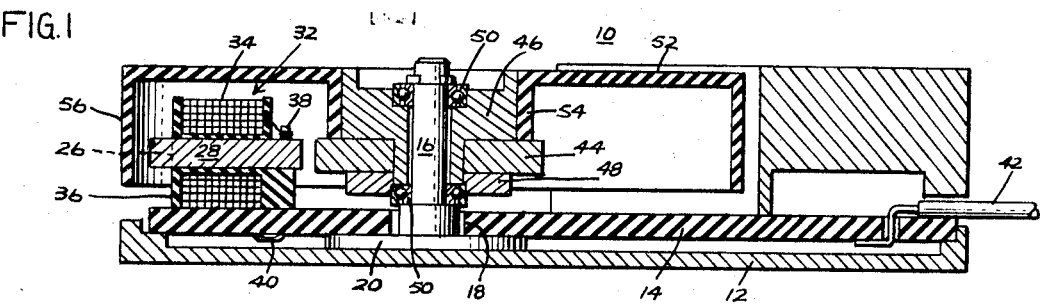
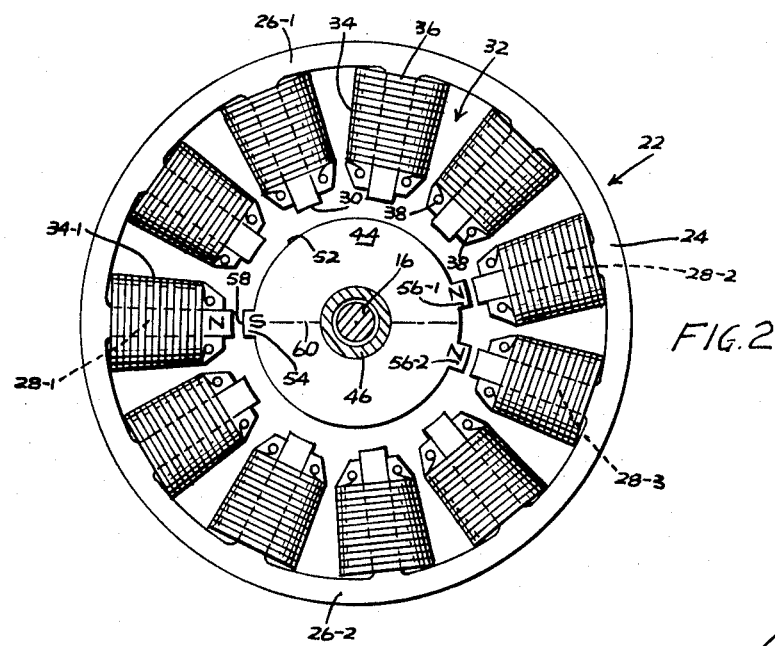
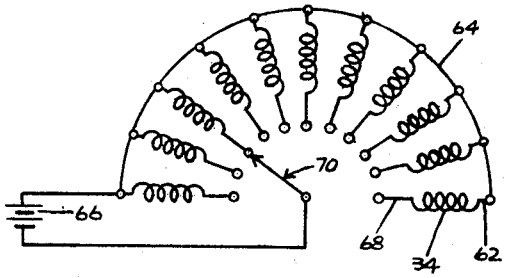
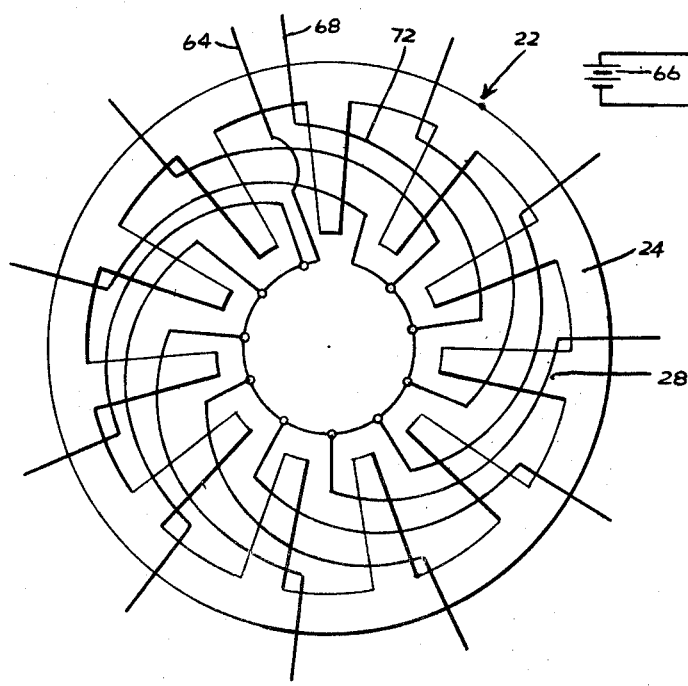
INVENTOR:
PHILLIP L. HARDEN,
BY Hood, Gust, Irish, Lundy & Coffey
ATTORNEYS.

ROTARY MAGNETIC POSITION INDICATOR HAVING ODD NUMBER OF POSITIONS

BACKGROUND OF THE INVENTION

1. Field of the Invention

This invention relates generally to rotary magnetic position indicators, and more particularly to a rotary magnetic position indicator having an odd number of positions.

2. Description of the Prior Art

Rotary magnetic position indicators are commonly employed for displaying discrete indicia in response to the characters of a prearranged code. A common type of such an indicator comprises a diametrically polarized permanent magnet rotor and a stator structure having selectively energizable field windings thereon, the rotor carrying a drum having the indicia displayed on its surface. Selective energization of the field windings causes the magnetic axis of the rotor to align itself with the respective poles of the field structure which are energized, thereby to provide the desired rotational indication.

Most rotary magnetic position indicators incorporate a stator structure having an even number of polar projections, such as ten or twelve, thus providing a corresponding even number of rotational positions. There are instances however when it is desired to provide an odd number of rotational positions, such as eleven. U.S. Pat. No. 3,201,785 discloses an eleven position rotary magnetic position indicator employing a stator structure having eleven equally angularly spaced polar projections and a diamond-shaped permanent magnet rotor having two diametrically opposed salient poles of opposite magnetic polarity. Thus, with one rotor pole in alignment with one stator pole, the other rotor pole is disposed between or bridges two adjacent stator poles. The construction of the aforesaid U.S. Pat. No. 3,201,785 has been found to be unstable when subjected to vibration, i.e., the rotor pole which should bridge two adjacent stator poles may align itself with one or the other of the adjacent stator poles thus providing an erroneous indication and further, there is a tendency for the rotor to advance from one stator pole to the next due to vibration.

It is therefore desirable to provide a rotary magnetic position indicator having an odd number of positions and which will lock into and remain in a selected position despite vibration.

SUMMARY OF THE INVENTION

A rotary magnetic position indicator having a magnetic stator structure including an odd number of radially inwardly extending, equally angularly spaced polar projections respectively having inner ends defining a bore. A magnetic rotor member is rotatably mounted in the bore, the rotor member having one pole of one polarity and two poles of the opposite polarity thereon, the two poles being respectively aligned with two of the stator polar projections when the one pole is aligned with another stator polar projection.

An object of the invention is to provide an improved rotary magnetic position indicator providing an odd number of positions.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side cross-sectional view illustrating a rotary magnetic position indicator incorporating the invention;

FIG. 2 is a top view, partly in cross-section, showing the stator and rotor assembly of the indicator of FIG. 1;

FIG. 3 is a schematic illustration showing the electrical connection of the coils of the indicator of FIGS. 1 and 2; and FIG. 4 is a schematic illustration showing another embodiment of the invention.

DESCRIPTION OF THE PREFERRED EMBODIMENT

Referring now to the Figures of the drawing, the improved rotary magnetic position indicator of the invention, generally indicated at 10, comprises a base plate 12 formed of suitable material, such as aluminum. Printed circuit board 14 formed of suitable insulating material is mounted on base plate 12. Shaft 16 projects upwardly through opening 18 in printed circuit board 14 and has flange 20 adhesively secured to base plate 12.

Stator structure 22 comprises core 24 formed of suitable magnetic material having yoke portion 26 with an odd number, shown here as eleven, of radially inwardly extending, equally angularly spaced polar projections 28 formed thereon. Polar projections 28 respectively have inner ends 30 mutually defining a bore. Bobbin coil assemblies 32 are respectively mounted on polar projections 28. Each of the coil assemblies 32 comprises coil 34 wound on bobbin 36 formed of suitable insulating material. Bobbin assemblies 32 are mounted on circuit board 14 by pins 38 to which the ends of coils 34 are connected. Printed wiring on printed circuit board 14 (not shown) connects ends 40 of pins 38 to external leads 42.

Permanent magnet rotor member 44 is supported by non-magnetic hub members 46, 48 rotatably supported on shaft 16 by bearings 50. Drum 52 formed of suitable material such as aluminum has inner flange 54 adhesively secured to hub member 46 and outer flange 56 upon which the indicia are displayed.

Rotor member 44 has a generally cylindrical outer periphery 52. In accordance with the invention, rotor member 44 has a first polar projection 54 of one polarity, such as South, and two polar projections 56-1 and 56-2 of the opposite polarity, such as North. Each of the rotor polar projections 54, 56 has an outer end 58 having generally the same angular extent as inner ends 30 of stator polar projections 28. Rotor projections 56-1 and 56-2 are equally spaced on opposite sides of diameter 60 which extends through polar projection 54, and are respectively aligned with an adjacent pair of stator polar projections 28 when projection 54 is aligned with another stator polar projection 28, as shown in FIG. 2. The grain of permanent magnet rotor member 44 is parallel with diameter 60.

Referring particularly to FIG. 3, ends 62 of coils 34 are connected together by a common connection 64, which may be a printed connection on printed circuit board 14, and to one side of source 66 of direct current. The other ends 68 of coils 34 are connected, as by printed connections on printed circuit board 14 and leads 42, to switching system shown schematically at 70, which selectively couples coils 34, one at a time, for energization across source 66 so that the inner end 30 of the respective stator polar projection 28 is polarized oppositely from rotor projection 54, such as North.

It will now be seen that with coil 34–1 energized, inner end 30 of stator polar projection 28–1 will be polarized North, thus causing the South-polarized rotor polar projection 54 to rotate into alignment with stator polar projection 28–1, the two North-polarized rotor polar projections 56–1 and 56–2 thus being respectively aligned with stator polar projections 28–2 and 28–3, as shown in FIG. 2. Thus, two discrete magnetic paths are provided for the magnetic flux, one through polar projection 28–1, yoke portion 26–1, consequent stator polar projection 28–2, North rotor polar projection 56–1, permanent magnet rotor 44, and South rotor polar projection 54, and the other through stator polar projection 28–1, yoke portion 26–2, consequent stator polar projection 28–3, North rotor polar projection 56–2, permanent magnet rotor member 44 and South rotor polar projection 54. It will be seen that by virtue of the provision of the one rotor polar projection 54 and the oppositely polarized rotor projections 56–1 and 56–2, the rotor will lock in with rotor polar projection 54 aligned with any stator polar projection 28 which has the coil 34 thereon energized, and that once so locked in, there is no tendency for rotor member 44 to be "bounced" to another position due to vibration. It will further be seen that since no two stator polar projections 28 are in diametric alignment, 180° rotation of rotor member 44 is never required and thus that rotor member 44 may be rotated to any selected position from any other position by energization of the respective coil 34.

Referring now to FIG. 4 in which like elements are indicated by like reference numerals, a distributed winding arrangement is shown wherein coils 72 respectively span three adjacent polar projections 28, the number of coils 72 being equal to the number of projections 28. A permanent magnet rotor member having the same configuration as rotor member 44 is employed. Coils 72 are energized, one at a time, as by switch 70 of FIG. 2.

While switching system 70 has been schematically shown as a simple rotary switch, it will be readily understood that a solid state logic switching system may be employed for selectively connecting coils 34 for energization in response to a binary code.

While there have been described above the principles of this invention in connection with specific apparatus, it is to be clearly understood that this description is made only by way of example and not as a limitation to the scope of the invention.

What is claimed is:

1. In a rotary magnetic position indicator: a magnetic stator structure including an odd number of radially inwardly extending, equally angularly spaced polar projections respectively having inner ends defining a bore; and a magnetic rotor member rotatably mounted in said bore, said rotor member having one pole of one polarity and two poles of the opposite polarity thereon, said two poles being respectively aligned with two adjacent ones of said polar projections when said one pole is aligned with another polar projection, each of said rotor member poles having an angular extent generally equal to that of the inner end of one only stator projection.

2. The indicator of claim 1 wherein said rotor member poles are radially outwardly extending polar projections.

3. The indicator of claim 2 wherein said rotor member is a permanent magnet.

4. The indicator of claim 3 wherein said two rotor member polar projections are equally spaced on opposite sides of a diameter of said rotor member which extends through said one rotor member polar projection.

5. The indicator of claim 1 wherein said stator structure further includes a coil on each of said polar projections thereof, and means for selectively energizing said coils one at a time thereby to polarize said inner end of the respective polar projection oppositely from the polarization of said one rotor member pole whereby said one rotor member pole aligns itself with the energized polar projection.

6. The indicator of claim 1 wherein said stator structure further includes an odd plurality of field coils equal in number to the number of said polar projections, each of said coils spanning three adjacent projections, and means for selectively energizing said coils one at a time.

* * * * *